(12) United States Patent
Lüke et al.

(10) Patent No.: US 8,934,666 B2
(45) Date of Patent: Jan. 13, 2015

(54) METHOD AND DEVICE FOR ANALYZING SURROUNDING OBJECTS AND/OR SURROUNDING SCENES, SUCH AS FOR OBJECT AND SCENE CLASS SEGMENTING

(75) Inventors: Stefan Lüke, Olpe (DE); Bernt Schiele, Darmstadt (DE); Christian Wojek, Darmstadt (DE)

(73) Assignee: ADC Automotive Distance Control Systems GmbH (DE)

( * ) Notice: Subject to any disclaimer, the term of this patent is extended or adjusted under 35 U.S.C. 154(b) by 727 days.

(21) Appl. No.: 13/123,017

(22) PCT Filed: Sep. 30, 2009

(86) PCT No.: PCT/EP2009/062654
§ 371 (c)(1),
(2), (4) Date: Apr. 7, 2011

(87) PCT Pub. No.: WO2010/040668
PCT Pub. Date: Apr. 15, 2010

(65) Prior Publication Data
US 2011/0200230 A1    Aug. 18, 2011

(30) Foreign Application Priority Data
Oct. 10, 2008  (EP) .................................... 08400043

(51) Int. Cl.
*G06K 9/00*      (2006.01)
*G06K 9/62*      (2006.01)
*G06T 7/00*      (2006.01)

(52) U.S. Cl.
CPC .......... *G06K 9/6297* (2013.01); *G06K 9/00791* (2013.01); *G06T 7/0087* (2013.01)

USPC .......................... 382/103; 382/100; 382/181

(58) Field of Classification Search
None
See application file for complete search history.

(56) References Cited

U.S. PATENT DOCUMENTS 7,940,264 B2 *   5/2011   Jojic et al. ..................... 345/420

OTHER PUBLICATIONS

Wang et al ("A dynamic conditional random field model for object segmentation in image sequences", 2005).*
Han et al ("Video Foreground Segmentation Based on Sequential Feature Clustering", 2006).*
Kumar et al ("A Hierarchical Field Framework for Unified Context-Based Classification", 2005).*
Yang Wang et al: "A Dynamic Conditional Random Field Model for Object Segmentation in Image Sequences" Computer Vision and Pattern Recognition, 2005 IEEE Computer Society Conference on, IEEE, Piscataway, NJ, USA, Bd. 1, Jun. 20, 2005, pp. 264-270, XP010817441 ISBN: 978-0-7695-2372-9.
Xiaoxu Ma et al: "Learning Coupled Conditional Random Field for Image Decomposition With Application on Object Categorization" Computer Vision and Pattern Recognition, 2008. CVPR 2008. IEEE Conference on, IEEE, Piscataway, NJ, USA, Jun. 23, 2008, pp. 1-8, XP031297151 ISBN: 978-1-4244-2242-5.

(Continued)

*Primary Examiner* — Avinash J Yentrapati
(74) *Attorney, Agent, or Firm* — RatnerPrestia

(57) ABSTRACT

The invention relates to a method and an object detection device for analyzing objects in the environment and/or scenes in the environment. The object detection device includes a data processing and/or evaluation device. In the data processing and/or evaluation device, image data ($x^r$) is evaluated on the basis of a Conditional Random Field (CRF) model and the CRF model provides additional object nodes ($o^t_n$) which take into account information from an object detector.

24 Claims, 7 Drawing Sheets

(56) References Cited

OTHER PUBLICATIONS

Nicolas S et al: "Document Image Segmentation Using a 2D Conditional Random Field Model" Document Analysis and Recognition. 2007. ICDAR 2007. Ninth International Conference on, IEEE, Piscataway, NJ, USA, Sep. 1, 2007, pp. 407-411, XP031157572 ISBN: 978-0-7695-2822-9.
Navneet Dalal and Bill Triggs. "Histograms of Oriented Gradients for Human Detection." In CVPR, 2005; pp. 1-8.
Antonio Torralba, Kevin P. Murphy, and William T. Freeman. "Sharing Features: Efficient Boosting Procedures for Multiclass Object Detection." In CVPR, 2004; pp. 1-8.
Winn J et al: "The Layout Consistent Random Field for Recognizing and Segmenting Partially Occluded Objects" Computer Vision and Pattern Recognition, 2006 IEEE Computer Society Conference on New York, NY, USA Jun. 17-22, 2006, Piscataway, NJ, USA,IEEE, Piscataway, NJ, USA, Bd. 1, Jun. 17, 2006, pp. 37-44, XP010922730 ISBN: 978-0-7695-2597-6.
Christian Wojek and Bernt Schiele. "A Dynamic Conditional Random Field Model for Joint Labeling of Object and Scene Classes." In ECCV, 2008, pp. 737-747.
Everingham, M., Zisserman, A. Williams, C., Van Gool, L. "The Pascal Visual Object Class Challenge Results." Technical Report, Pascal Network (2006).
Torralba, A. "Contextual Priming for Object Detection." IJCV (2003), pp. 169-191.
Hoiem, D., Efros, A.A., Hebert, M. "Putting Objects in Perspective" In: CVPR, (2006).
He, X., Zemel, R.S., Carriera-Perpiñán, M.A. "Multiscale Conditional Random Fields for Image Labelling." In CVPR, (2004), pp. 1-8.
Kumar, S., Hebert, M. "A Hierarchical Field Framework for Unified Context-Based Classification.". In ICCV. (2005).
Shotton, J., Winn, J., Rother, C., Criminisi, A. "Textonboost: Joint Appearance Shape and Context Modelling for Multi-Class Object Recognition and Segmentation". In ECCV (2006).
Torralba, A., Murphy, K.P., Freeman, W.T. "Contextual Models for Object Detection Using Boosted Random Fields." In NIPS. (2004).
McCallum, A., Rohanimasnesh, K. Sutton, C. "Dynamic Conditional Random Fields for Jointly Labeling Multiple Sequences." In NIPS Workshop on Syntax, Semantics. (2003).
Lafferty, J.D., McCallum, A. Pereira, F.C.N. "Conditional Random Fields: Probabilistic Models for Segmenting and Labeling Sequence Data." In ICML. (2001).
Kumar, S., Hebert, M. "Discriminative Random Fields: A Discriminative Framework for Contextual Interaction in Classification." In ICCV. (2003).
Verbeek, J., Triggs, B. "Region Classification With Markov Field Aspect Models." In CVPR. (2007).
Quattoni, A., Collins, M., Darrell, T. "Conditional Random Fields for Object Recognition." In NIPS (2004).
Kapoor, A., Winn, J. "Located Hidden Random Fields: Learning Discriminative Parts for Object Recognition." In ECCV. (2006).
Yin, Z., Collins, R. Belief Propagation in a 3D Spatio-Temporal MRF for Moving Object Detection. In CVPR. (2007), pp. 1-8.
Leibe, B., Cornelis, N., Cornelis, K., Gool, L.V. Dynamic 3D Scene Analysis From a Moving Vehicle. In CVPR (2007), pp. 1-8.
Platt, J., "Probabilistic Outputs for Support Vector Machines and Comparison to Regularized Likelihood Methods." In Smola, A.J., Bartlett, P., Schoelkopf, B., Schuurmans, D., Eds.: Advances in Large Margin Classifiers. (2000) 61-74.
Kalman, R.E. A New Approach to Linear Filtering and Prediction Problems. Transaction of the ASME-Journal of Basic Engineering 82 (1960), pp. 35-45.
Sutton, C., McCallum, A. "Piecewise Training for Undirected Models." In: 21th Annual Conference on Uncertainty in Artificial Intelligence (UAI-05). (2005).
Vishwanathan, S.V.N., Schraudolph, N.N., Schmidt, M.W., Murphy, K.P. "Accelerated Training of Conditional Random Fields With Stochastic Gradient Methods." In ICML (2006).
Hel-Or, Y., Hel-Or, H. "Real-Time Pattern Matching Using Projection Kernels." PAMI 27 (2005), pp. 1430-1445.
Alon, Y., Ferencz, A., Shashua, A. "Off-Road Path Following Using Region Classification and Geometric Projection Constraints." In: CVPR. (2006), pp. 1-8.
Varma, M., Zisserman, A. "Classifying Images of Materials: Achieving Viewpoint and Illumination Independence." In: ECCV (2002).
Russel, B.C., Torralba, A., Murphy, K.P., Freeman, W.T. "Labelme: A Database and Web-Based Tool for Image Annotation." IJCV 77 (2008) 157-173.

\* cited by examiner

METHOD AND DEVICE FOR ANALYZING SURROUNDING OBJECTS AND/OR SURROUNDING SCENES, SUCH AS FOR OBJECT AND SCENE CLASS SEGMENTING

CROSS REFERENCE TO RELATED APPLICATIONS

This application is the U.S. national phase application of PCT International Phase Application No. PCT/EP2009/062654, filed Sep. 30, 2009, which claims priority to German Patent Application No. 08400043.9, filed Oct. 10, 2008, the contents of both applications being incorporated by reference herein.

FIELD OF THE INVENTION

The invention relates to methods for analysing objects in the environment and/or scenes in the environment with an evaluation unit, an object detection device for analysing objects in the environment and/or scenes in the environment with a data processing and/or evaluation device and a vehicle with an object detection device for analysing objects in the environment and/or scenes in the environment with a data processing and/or evaluation device, wherein image data is evaluated in the evaluation unit or data processing and/or data evaluation device respectively.

The invention relates to a method for segmenting objects and scene classes from a sequence of images. The invention is used e.g. in motor vehicles which are equipped with a sensor system for recording and analysing the vehicle environment.

BACKGROUND OF THE INVENTION

For the purpose of analysing images, methods are known from the prior art which provide pixel-by-pixel evaluation. For example, a Markov model or CRF (Conditional Random Field) model is frequently used. These models calculate the connections of adjacent pixels (nodes). The information which can be extracted locally from an image section is however restricted in the standard formulation of a CRF model. Edge potentials in pairs are too weak in order to model interactions at a large spatial distance. Ideally, a complete, tightly filled layer with unobservable nodes for all layers and scales would be added to the CRF standard model. However, it would be take a lot of time or be very costly to calculate inferences in such a model, however, due to the required level of complexity of the calculation.

SUMMARY OF THE INVENTION

An object of the present invention is therefore to improve the already known prior art described above or explained in greater detail in the text below.

This object is attained by means of methods for analysing objects in the environment and/or scenes in the environment with an evaluation unit, an object detection device for analysing objects in the environment and/or scenes in the environment with a data processing and/or evaluation device for analysing objects in the environment and/or scenes in the environment with a data processing and/or evaluation device.

A solution is attained by means of an automated method or a corresponding arrangement, i.e. electronically with the aid of suitable electronics and/or using sensors with the aid of suitable sensors and/or using data processing (software) with the aid of a suitable data processing device and/or data storage device. Here, an object detector for image data can be used which is implemented as suitable detector hardware or detector electronics, as well as detector software. The invention is, however, not limited to this; a laser sensor, radar sensor or a combination of sensors can equally be used for the purpose for example. The invention can be realised in a vehicle with the aid of sensors or cameras as pre-processing hardware for supplying input data and/or input images and/or input videos for the objects or methods according to the method. Furthermore, databases or similar data storage means can be used in order to store this input data and/or these input images and/or input videos and/or to supply comparative data and/or comparative images and/or comparative classes for the objects or methods according to the invention—such as for the purpose of object and scene class segmentation.

Further embodiments and details of the invention are described herein. In a first embodiment of the present invention individual nodes are inserted on individual dedicated layers. In order to instantiate these nodes, a user-defined object detector is used, such as a multi-scale object detector. A further notion is that alongside the data output or result from an object detector according to the invention, the consistence of a texture classification is included, e.g. the consistency of a texture classification is tested in the node network presented below.

For greater clarification, further aspects of the invention will now be described below.

A pixel-by-pixel segmentation of a input video image in classes such as road, vehicle, edge strip/roadway marking or shrub/forest enables in the close proximity range a complete image-based scene comprehension and thus for example the calculation of the action space for evasion manoeuvres in emergency situations. Within the scope of the invention, a new version of the Conditional Random Field (CRF) framework is recommended. This enables, alongside the use of local low-level features (such as filter bank responses), the use of detected objects and the time progression of input images, in order to support the segmentation. These aspects of the invention will be explained below in three stages. After a brief introduction of the basic model, said model will initially be extended in the subsequent sections by additional probability variables for the representation of objects. Subsequently, a dynamic extension will be recommended for the inference over several input images. For a more detailed description of the models, please refer to Wojek and Schiele-See: Christian Wojek and Bernt Schiele. A dynamic conditional random field model for joint labelling of object and scene classes. In ECCV, 2008.

Conditional Random Field Basic Model

If the random variables $I^t = \{i_1^t, \ldots, i_N^t\}$ are the input image at the point in time t and $C^t = \{c_1^t, \ldots, c_M^t\}$ is the quantity of nodes for which a segmentation is to be determined, then CRFs, based on the Markov assumption, are the conditional probability of a segmentation $P(C^t|I^t)$ for a static image. FIG. 1 shows the corresponding graphic model. While the node potentials $\phi$ are formed on the basis of filter bank responses and subsequent classification with Joint BoostingSee: Antonio Torralba, Kevin P. Murphy, and William T. Freeman, Sharing features: Efficient boosting procedures for multiclass object detection. In CVPR, 2004., the potentials in pairs $\psi$ permit adjacent relationships to be modelled. These are automatically learned from the statistics of a training data record with the aid of a gradient descent procedure. A solution by approximation of the inference problem is for example possible using Loopy Belief Propagation, but is not restricted to this.

FIG. 2 shows several exemplary results, wherein the results of the filter bank-supported classification in column 3 and the results of the CRF basic model in column 4 are shown. It can be seen that while using a CRF may result in a clearly smoothed result, problems occur for the vehicle class which is frequently overwritten by other classes. This is essentially due to the locality of the filter bank features.

Object CRF

In contrast to filter bank features, features for detecting objects (e.g. Dalal and TriggsSee: Navneet Dalal and Bill Triggs. Histograms of oriented gradients for human detection. In CVPR, 2005) are calculated over a larger image area and thus enable more reliable results, such as for rigid object classes such as vehicles. The CRF basic model can be expanded by inserting additional random variables, in order to make full use of the object detector for the scene segmentation. Here, for each object detection, an additional random variable $o_n^t$ is inserted at the corresponding position in the grid (as shown in FIG. 3). It gives the probability for the presence of a vehicle at the corresponding position in the image. Additional potentials $\Omega$ and $\Lambda$ can be used in order to model the confidence of the object detector or the consistency of a hypothetical object with the filter bank response (ref. Winn and ShottonSee: John Winn and Jamie Shotton. The layout consistent random field for recognizing and degmenting partially occluded objects. In CVPR, 2006). Thus, the use of the potential $\Omega$ is at least a partial function of an object detector. From column 5 in FIG. 2, it can be seen that due to the additional random variables, the segmentation precision for vehicles is significantly improved. However, errors occur if a detection of vehicles is not possible (e.g. on the edge of an image). A time-dynamic extension of the model can be useful, however.

Dynamic CRF

For highly dynamic scenes such as overtaking scenes, it should first be noted that the movement speed in the image for vehicles and for background classes are extremely different in the image. As a result, they must be modelled differently. Thus, according to the invention, vehicle objects can be followed e.g. with a Kalman filter. Here the a posteriori probability distribution $P(C^t|I^t)$ of the segmentation at the time point t is propagated as a priori distribution $P(C^{t+1})$ for the next input image. The random variables $o_n^t$ for the representation of objects are instanced from the Kalman Filter Tracks instead of being detected. The last column in FIG. 2 shows that the dynamic CRF model can now also better segment vehicles which for certain periods of time cannot be detected.

With the invention, for example, a pixel-by-pixel segmentation precision of 88.1% can now be achieved overall on a representative data record consisting of 88 sequences, each with eleven successive images.

Another aspect of the present invention relates according to one embodiment to a method for analysing objects in the environment and/or scenes in the environment with an evaluation unit, wherein in the evaluation unit, image data is evaluated based on a CRF model, and the CRF model provides additional object nodes which take into account information from an object detector.

A further embodiment of the invention relates to a method for analysing objects in the environment and/or scenes in the environment with an evaluation unit, wherein in the evaluation unit, image data is evaluated based on a CRF model, wherein a shared segmentation of object and scene classes is conducted and dynamic information is integrated during the object detection and scene classification.

Advantages and special designs of the forenamed embodiments are described in the text below.

Thus, one embodiment provides that during the analysis of objects in the environment and/or scenes in the environment a modelling of adjacent relationships ($N_2$, $N_3$) of the nodes of the CRF model is conducted.

Another embodiment of the invention provides that the modelling of adjacent relationships ($N_2$, $N_3$) is conducted using edge potentials.

Yet another embodiment of the invention provides that within the scope of the analysis of objects in the environment and/or scenes in the environment a Support Vector Machine is also used for object detection and/or for object classification.

Still yet another embodiment of the invention provides that based on the CRF model during object detection and/or scene classification, moved cameras and/or moved objects are modelled.

Another embodiment of the invention provides that objects and scenes are modelled in a shared segmentation stage (labelling approach), wherein the modelling is conducted at two different model layers with different information granularity and different segmentations in a dynamic CRF model. Here, it can be provided that at least one second model layer with reduced information granularity is used in order to represent object nodes, and the method is conducted on the basis of dynamic image sequences, which contain objects of any size required.

Another embodiment of the invention provides that a pixel-by-pixel object and/or scene class segmentation is conducted.

Yet another embodiment of the invention provides that objects of any size required are integrated into a CRF framework, and an inference is conducted jointly for objects and context and/or scene classes.

Still yet another embodiment of the invention provides that edge potentials are modelled, wherein a scale provided by the object detector is taken into account or evaluated.

A further embodiment of the invention relates to an object detection device for analysing objects in the environment and/or scenes in the environment with a data processing and/or evaluation device, wherein in the one data processing and/or evaluation device, image data based on a CRF model is evaluated, and the CRF model provides additional object nodes which take into account information from an object detector.

A further embodiment of the invention relates to a vehicle with an object detection device for analysing objects in the environment and/or scenes in the environment with a data processing and/or evaluation device, wherein in the data processing and/or evaluation device, image data is evaluated based on a CRF model, and the CRF model provides additional object nodes which take into account information from an object detector, with a data storage device for storing image data which is connected in terms of data to the object detection device and/or to the data processing and/or evaluation device.

Advantages and designs of these forenamed embodiments are also described in the text below. These embodiments can be designed specifically to conduct an forenamed method, and can also be further developed according to other features described above or below.

Another embodiment of the invention provides that the object detection device is integrated into a camera device or sensor device.

Further advantages and application possibilities of the present invention can be found in the description below in connection with the exemplary embodiment(s) shown in the drawing(s).

BRIEF DESCRIPTION OF THE DRAWINGS

The invention is best understood from the following detailed description when read in connection with the accompanying drawings. Included in the drawings is the following Figures:

In the drawings:

FIG. 4 (b): shows a graphic model for the fully dynamic CRF. Observed nodes are grey, non-observable variables are white. For improved legibility, the spatial layout of $y^t$ with the related edge potential $\psi$ has been omitted;

DETAILED DESCRIPTION OF THE PREFERRED EMBODIMENTS

Figure 1:
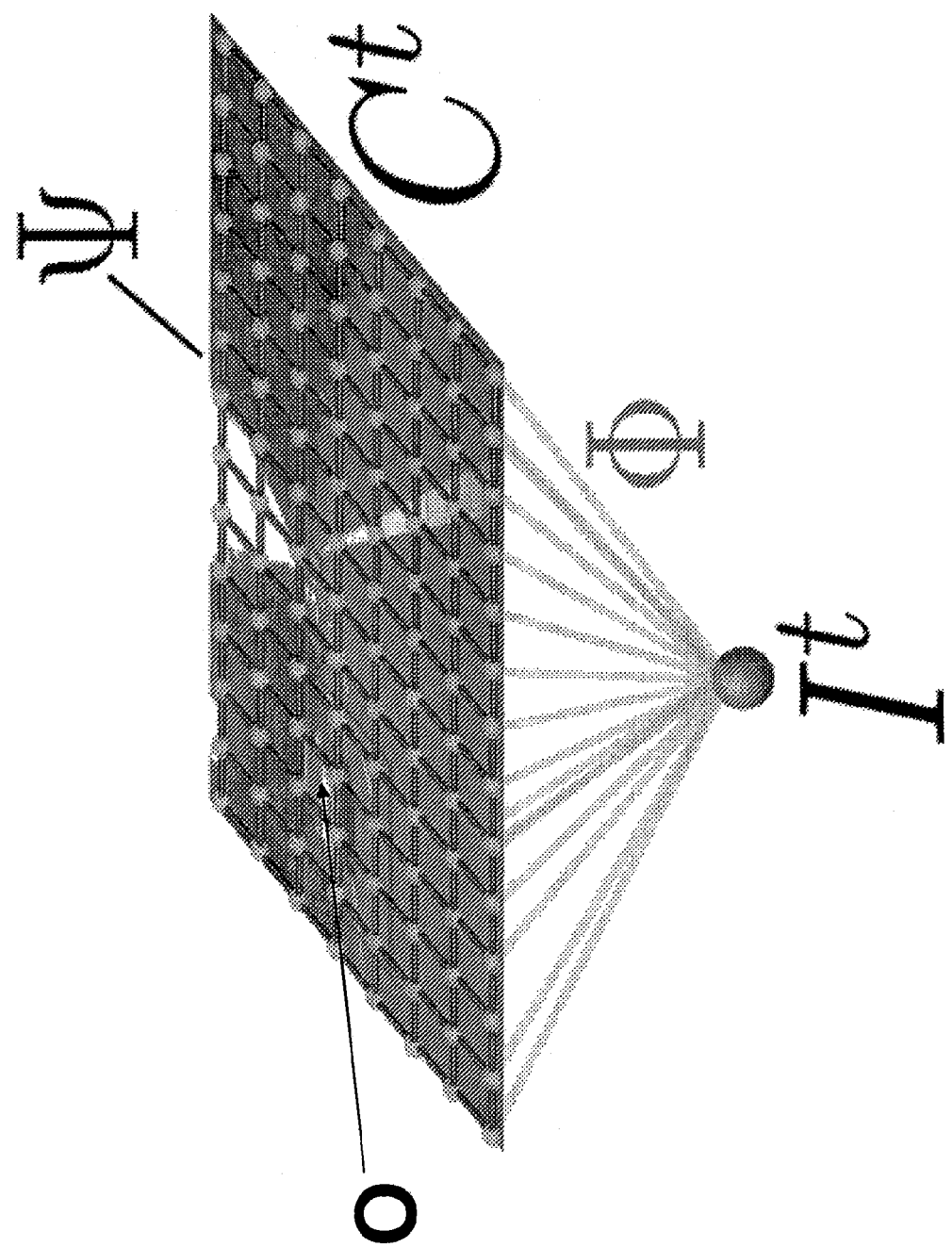
FIG. 1: shows a graphic diagram of the CRF basic model.
Figure 2:
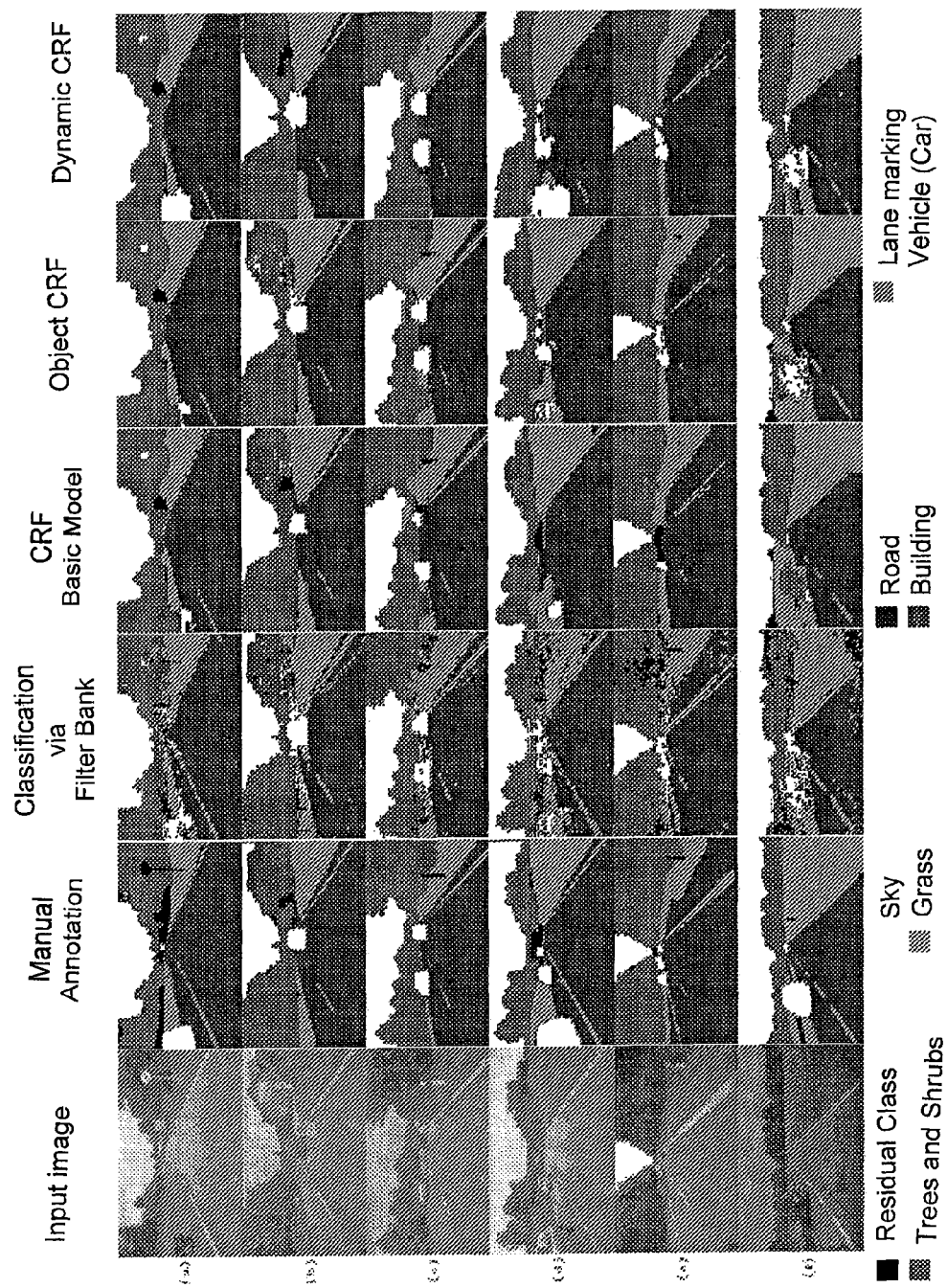
FIG. 2: shows sample results for different classifications or CRF models.

In the description below, the same elements and/or those with the same function can be assigned the same reference numerals. The absolute values and dimensions given below are only sample values and do not indicate a restriction of the invention to dimensions of this type.

Figure 3:
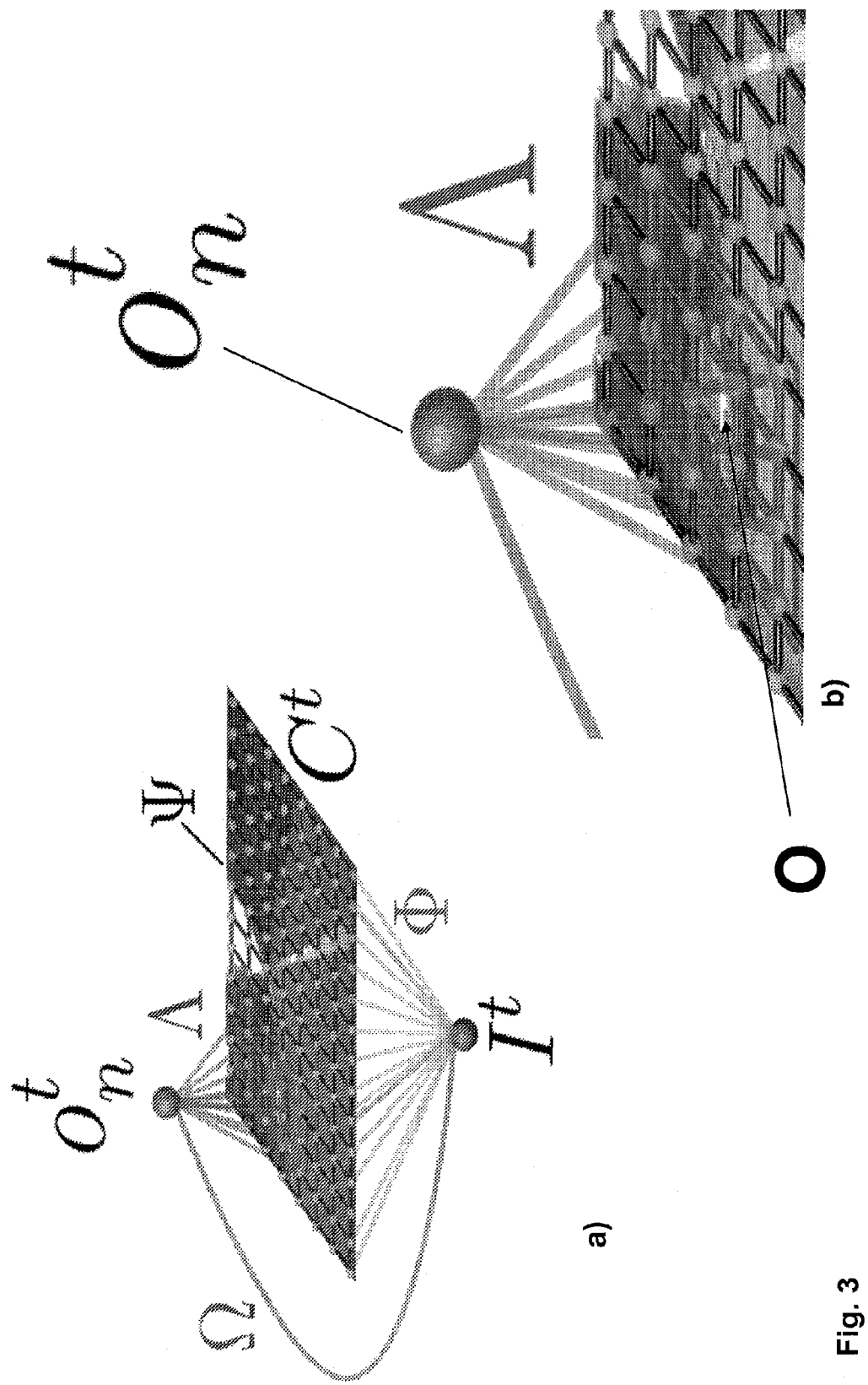
FIG. 3 (a) and (b): show a graphic diagram of the object CRF model, with section enlargement in FIG. 3 (b)
Figure 4:
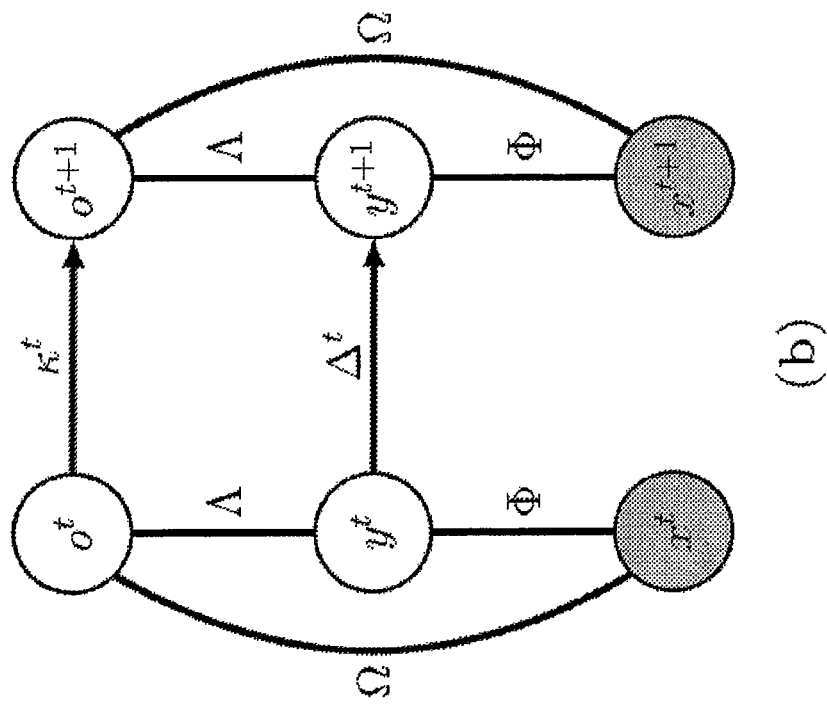
FIG. 4 (a): shows an alternative diagram of a graphic model for the object CRF. Different edge colours describe different potentials.
Figure 4:
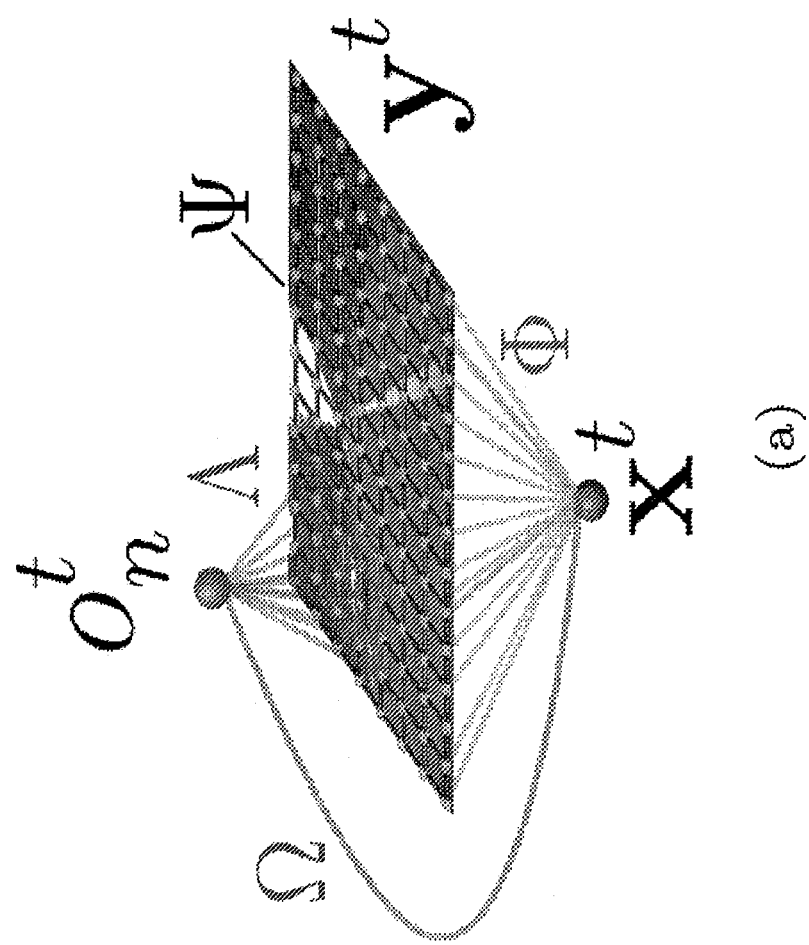
Figure 5:
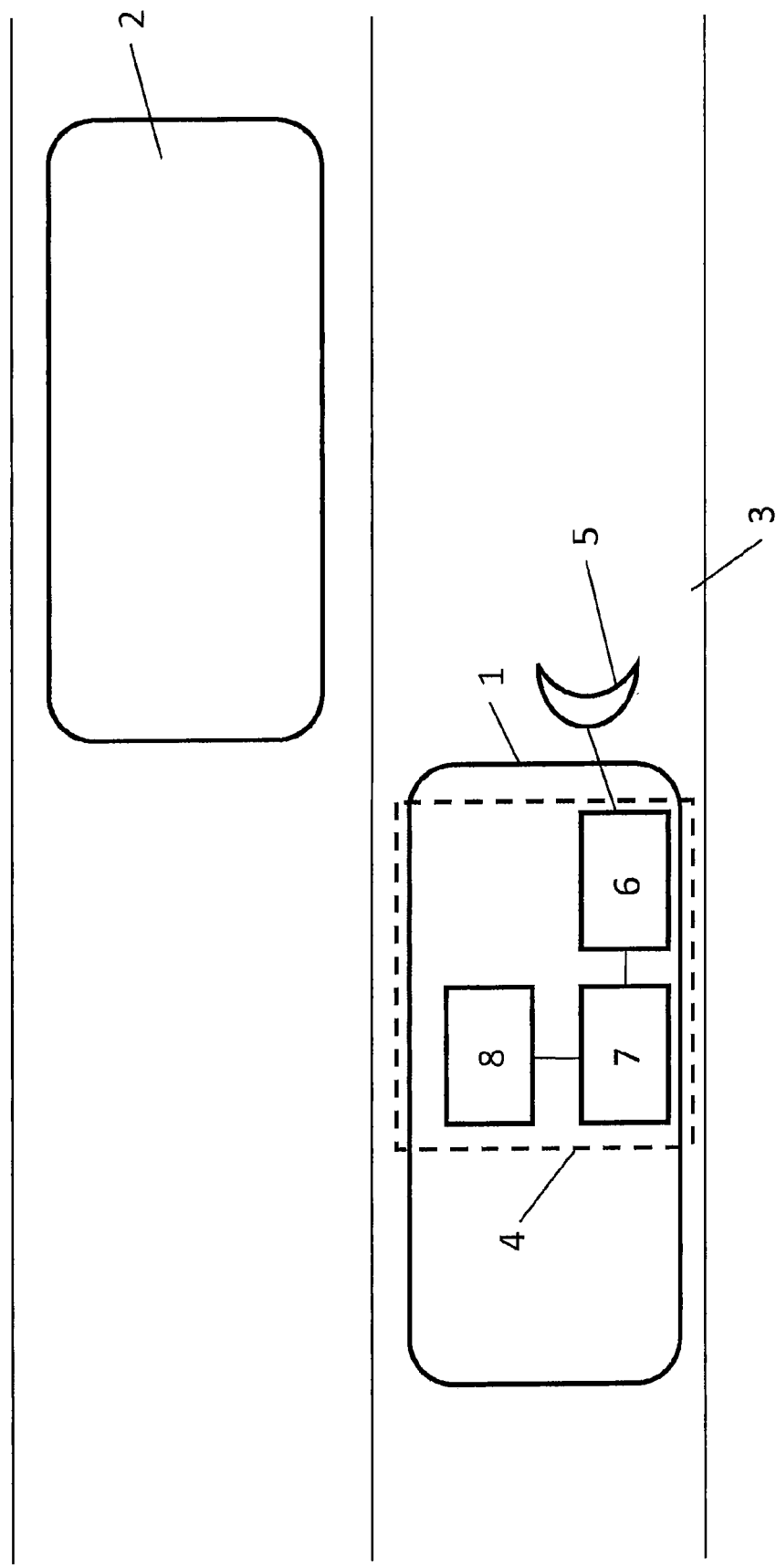
FIG. 5: shows a schematic view of a device for a vehicle according to the invention.

FIG. 1 shows a basic CRF model. By contrast, FIGS. 3 and 4 show a CRF model with an additional object node $o^t_n$. This node has been added to the standard CRF model: X represents the input image, $\Omega$ the input data or object potential, Y a variable for classes e.g. road, marking, building, vegetation, sky etc., $o^t_n$ represents objects O to be detected e.g. car, lorry etc.

The additional nodes collect information on the appearance of objects from a highly spatial model and from their environment. This contains all subordinate nodes, which support the object hypothesis of the y layer.

The inserted nodes have several states, wherein the number of states is determined by the number of detected object classes. A state is either a real object hypothesis of an object class or is in the background. As an example, it is shown how, for a model with two states, the energy formulation changes from the equation in FIG. 4 to the object CRF by the introduction of two additional potentials:

$$\log(P_{oCRF}(y^t, o^t | x^t, \Theta)) = \log(P_{pCRF}(y^t | x^t, N_2, \Theta)) + \sum_n \Omega(o^t_n, x^t; \Theta_\Omega) + \sum_{(i,j,n) \in N_3} \Lambda(y^t_i, y^t_j, o^t_n, x^t; \Theta_\Psi)$$

Here, $N_2 \subset N_1$ designates all adjacent relationships on which no object is visible in the image, wherein by contrast, $N_3$ designates all adjacent relationships between the two layers at point on which an object detection is present. $\Omega$ is the new node potential, wherein by contrast, $\Lambda$ is the edge potential for edges between the two layers.

Object Node Potential

In order to model an object node potential, a random object detector is used. For example, an HOG multiple scale sliding window object detector according to Dalal & Triggs (CVPR 2005) is used, wherein the features of a window are defined in an advantageous design by $g(\{x^1\}o_n)$ and are classified e.g. by means of a linear Support Vector Machine (SVM) into object and background. The weights of the SVM are here v, the axis displacement b. In order to obtain a probabilistic interpretation for the classification confidence, e.g. the method according to Platt is used (Advances in Large Margin Classifiers 2000), and a Sigmoid model with parameters $s_1$ and $s_2$ is adapted using cross validation.

$$\Omega(o^t_n, x^t; \Theta_\Omega) = \log \frac{1}{1 + \exp(s_1 \cdot (v^T \cdot g(\{x^t\})_{o_n} + b) + s_2)}$$

Edge Potentials Between Layers

Between the layers, the adjacent relationships are modelled using edge potentials which are defined e.g. via the object nodes $o^t_n$ and two subordinate nodes in the y layer $y^t_i$, $y^t_j$. As on the y layer, the strength of the interaction with a linear classifier is determined with weightings $\Theta_{\Lambda=u}$.

$$\Lambda(y^t_i, y^t_j, o^t_n, x^t; \Theta_\Lambda) = \sum_{(k,l) \in C; m \in O} u^T \begin{pmatrix} 1 \\ d^t_{ij} \end{pmatrix} \delta(y^t_i = k) \delta(y^t_j = l) \delta(o^t_n = m)$$

Additionally, the object scales determined by the object detector can be used in order to train different weights for hypotheses of different scales. As a result, a real CRF multiple scale model can be realised. Furthermore, we use different weights for different parts of the model and as a result, model a consistent object structure.

Dynamic CRF: dual layer object CRF for simultaneous inference of object and scene class segmentation Although the additional information from the object detector already improves segmentation, the segmentation can be further improved by time dynamic modelling. For highly dynamic scenes—such as image sequences from a moving vehicle—it should be noted that objects have an essentially different dynamic to that of the scene. As a result, these should also be modelled differently.

For objects, the relative speed is estimated and the objects are tracked in 3D global coordinates using a temporal filter. The dynamic of the remaining scenes is caused primarily by the movement of the camera itself. For this reason, the inference results are used from the time stage t as prior for the subsequent time stage t+1.

Object Dynamic Model

For the object tracking, a Kalman filter is preferably used for each object. Due to the known camera calibration, the tracking in 3D is made possible by the assumption that the objects are located on the same area. Furthermore, the status vector receives the object width, object speed and inclination of the camera, together with the first derivatives.

For example, a linear movement model can be used, wherein the object acceleration is described as system noise. The confidence of the object hypotheses is given by the confidence of the last associated measurement. The following model results:

$$\log(P_{tCRF}(y^t, o^t \mid x^t, \Theta)) = \log(P_{pCRF}(y^t \mid x^t, N_2, \Theta)) +$$
$$\sum_n \kappa^t(o_n^t, o^{t-1}, x^t; \Theta_\kappa) + \sum_{(i,j,n) \in N_3} \Lambda(y_i^t, y_j^t, o_n^t, x^t; \Theta_\Lambda)$$

Here, $\kappa^t$ designates the probability of an object hypothesis $o_n^t$ at the point in time t, given the history of input images. It replaces the potential $\Omega$ introduced previously.

Scene Dynamic Model

In the sense of the recursive Bayes state estimation using a Markov assumption, the a posteriori distribution $y^{t-1}$ in the time stage t−1 is regarded as the a priori distribution for the time stage t. However, for dynamic scenes, the image content must be adapted to make it suitable for the grid which is present as a basis in order to associate the individual image points with the correct a priori distribution. At this point, the assumption of a flat world is made and a projection matrix Q is estimated from the camera speed and the calibration. The following model is obtained as a result:

$$\log(P_{dCRF}(y^t, o^t, x^t \mid y^{t-1}, o^{t-1}, \Theta)) =$$
$$\log(P_{tCRF}(y^t, o^t \mid x^t, \Theta)) + \sum_i \Delta^t(y_i^t, y_i^{t-1}; \Theta_{\Delta^t})$$

Further embodiments of the invention are included in the following text:

Object detection and pixel-by-pixel scene segmentation (scene labelling) have both been very active research fields in recent years, and impressive results have been reported for both objectives separately. The aim is to increase the performance for both objectives through the integration of these different types of solution approach, since object detection benefits from effective scene segmentation (scene labelling), and a pixel-by-pixel scene segmentation (scene labelling) can also benefit from effective object detection. As a result, the first solution approaches were recommended which aim to integrate both object detection and scene segmentation (scene labelling) into a shared framework. The invention recommends a new solution approach, based on Conditional Random Field (CRF) models, which supplements the existing work through 1) the formulation of the integration as a shared segmentation problem of object and scene classes and 2) the systematic integration of dynamic information for the purpose of object detection and for the purpose of scene segmentation. As a result, the solution approach can be used for highly dynamic scenes including both faster camera movements and faster object movements. Experiments show the applicability of the new solution approach to challenging video sequences in the real world, and systematically analyse the contribution made by different system components to the overall effectiveness.

Today, object class detection methods are capable of achieving impressive results with challenging data records (e.g. PASCAL competition See: Navneet Dalal and Bill Triggs. Histograms of oriented gradients for human detection. In CVPR, 2005). Frequently, these methods combine effective feature vectors such as SIFT or HOG with the effectiveness of discriminative classifiers such as SVMs and Ada-Boost. At the same time, several authors have argued that the global scene context See: Torralba, A. Contextual priming for object detection. IJCV (2003) 169-292 and Hoiem, D., Efros, A. A., Herbert, M: Putting objects in perspective. In CVPR (2006) is a valuable input (cue) for object detection, and should thus be used in order to support object detection. By contrast, this context-related work has focussed almost exclusively on static scenes. Since this invention focuses specifically on highly dynamic scenes, the object movement is also modelled as an additional and important input for detection.

Recently, pixel-by-pixel scene segmentation has also been an active research field. A, standard solution approach is to use Markov or Conditional Random Field (CRF) models in order to improve the effectiveness of adjacent dependencies through modelling. Several authors have introduced the implicit representation (notion) of objects in CRF models See: He, X., Zemel, R. S., Carreira-Perpiñán, M. A. Multiscale conditional random fields for image labelling. In: CVPR (2004), Kumar, S., Hebert, A: A hierarchical field framework for unified context-based classification. In: ICCV (2005), Shotton, J., Winn, J., Rother, C. Criminisi, A.: Textonboost: Joint appearance shape and context modelling for multi-class object recognition and segmentation. In: ECCV (2006), and Torralba, A., Murphy, K. P., Freeman, W. T.: Contextual models for object detection using boosted random fields. In: NIPS. (2004). The interactions between object nodes and scene segmentations (scene labels) are by contrast frequently limited to a unidirectional information flow, and as a result, these models have not yet shown the full potential of the simultaneous observation of objects and scenes. Due to the formulation of this problem as a shared classification problem for object and scene classes, this invention introduces a more general representation of the object-scene interaction which enables a bidirectional information flow. When interest focuses on dynamic scenes, the representation of dynamic CRFs See: McCallum, A., Rohanimasnesh, K. Sutton, C.: Dynamic conditional random fields for jointly labelling multiple sequences. In: NIPS Workshop on Syntax, Semantics. (2003) is also used, which are extended in order to be able to handle both moved cameras and moved objects.

For this reason, a solution approach is recommended in which objects and scene classes are segmented jointly in highly dynamic scenes, for the purpose of which a new real world data record is introduced with pixel-by-pixel manual segmentation. Highly dynamic scenes are not only a scientific challenge, but also an important problem, e.g. for applications such as autonomous driving or video indexing, where both the camera and the objects move independently from each other. The formulation of the problem as a shared segmentation problem makes it possible 1) to model the dynamic of the scene and the object separately from each other, which is of significance for the scenario of objects and camera which move independently of each other, and 2) to permit a bidirectional information flow between the object class segmentation and the scene class segmentation.

The remainder of the present description is structured as follows: section 2 considers related work in the field of scene segmentation and scene analysis in connection with object detection. Section 3 introduces the solution approach according to the invention and discusses how object detection and scene segmentation can be integrated as a shared segmentation problem in a dynamic CRF formulation. Section 4 introduces the applied features, describes details relating to the experiments and shows results of experiments. Finally, section 5 draws conclusions.

2. Related Works

In recent years, Conditional Random Fields (CRFs) See: Lafferty, J. D., McCallum, A., Pereira, F. C. N.: Conditional random fields: Probabilistic models for segmenting and labelling sequence data. In ICML 2001) have become a popular framework for image segmentation (image labelling) and scene comprehension. By contrast, according to the best knowledge of the inventor, there is no work which explicitly models object units in dynamic scenes. It is hereby recommended that objects and scenes be modelled in a shared segmentation approach (labelling approach), at two different levels or layers with different information granularity and different segmentations in a dynamic CRF See: McCallum, A., Rohanimasnesh, K. Sutton, C.: Dynamic conditional random fields for jointly labelling multiple sequences. In: NIPS Workshop on Syntax, Semantics. (2003).

Related works can be roughly divided into two groups. On the one hand, there are related works regarding CRF models for scene comprehension, and on the other, there are solution approaches in order to integrate object detection and scene comprehension.

In Kumar, S., Herbert, M.: Discriminative random fields: A discriminative framework for contextual interaction in classification. In: ICCV (2003), Kumar and Herbert detected structures created by humans in natural scenes using a single layer CRF. Later, they extended this work in order to be able to handle several classes in a dual layer framework See: Kumar, S., Herbert, M.: A hierarchical field framework for unified context-based classification. In: ICCV (2005). Kumar and Herbert also studied object-context interaction and combined a simple, reinforced object detector for side observation of cars with a scene context of roads and buildings on the basis of a database with static images and objects of a fixed size. They allow an inference to run separately on their two layers and each detector hypothesis is now modelled in an adjacent relation with an entire region on the second layer. In contrast to this, the present invention integrates objects of any size into a CRF framework, wherein inference is conducted jointly for objects and context. Additionally, the invention recommends that edge potentials be modelled in a consistent layout by means of the fact that the scale supplied by an object detector according to the prior art is evaluated Dalal, N., Triggs, B.: Histograms of oriented gradients for human detection. In: CVPR (2005). Torralba et al See: Contextual models for object detection using boosted random fields. In: NIPS (2004) use AdaBoost classifiers in order to model unary potentials and interaction potentials, to enable the joint segmentation (labelling) of object classes and scene classes. However, the authors do not use an object detector for entire objects. Within the scope of the invention, it has been discovered that a separate object detector is essential for improved effectiveness. Torrelaba et al. also use separate layers respectively for object classes and scene classes, and thus, the inference is complex due to the high level of graph connectivity, and furthermore, they work on a static image database in which the objects all have the same size. The invention introduces a sparsely occupied layer in order to represent object hypotheses and works on the basis of dynamic image sequences which contain objects of any size. Further works for simultaneous object detection and scene segmentation have been conducted by Shotton et al., Textonboost: Joint appearance shape and context modelling for multi-class object recognition and segmentation. In: ECCV (2006). Their error matrix (confusion matrix) shows that in object classes, colour and texture information is frequently inadequate in order to describe static images—such as boat, chair, bird, cow, sheep, dog—and that this leads to poor results. While their Texton feature is even capable of evaluating context information from image pixels at a greater distance, the forenamed object classes remain problematic due to the unknown object scale/object size or unknown object dimension. Furthermore, He et al., A dynamic conditional random field model for joint labelling of object and scene classes. In. ECCV, 2008 present a multiple scale CRF which contains a plurality of layers, building on features of different scales. By contrast, they do not model the explicit representation of objects, and their nodes in higher layers tend rather to serve as switches for different simultaneous context and object events (co-occurrences). Equally, Verbeek and Triggs, Region classification with markov field aspect models. In: CVPR (2007) add information regarding the simultaneous occurrence of classes with the aid of a topic model. Finally, different authors have recommended that the CRF framework for object detection be adopted as an independent task See: Quattoni et al., Conditional random fields for object recognition. In: NIPS (2004), Kapoor et al., "Located hidden random fields: Learning discriminative parts for object recognition: In: ECCV (2006), without any argumentation regarding the context, and report results solely for static image databases with objects of one size.

Dynamic CRFs are evaluated by Wang and Ji, A dynamic conditional random field model for object segmentation in image sequences. In: CVPR (2005) for the purpose of image segmentation with intensity and movement input with primarily static image sequences. Equally, Yin and Collings, Belief propagation in a 3D spatio-temporal MRF for moving object detection. In: CVPR (2007) recommend an MRF with temporal adjacencies for movement segmentation with a moved camera.

The second part of the related works deals with scene comprehension solution approaches from the observation of objects. Leibe et al., Dynamic 3D scene analysis form a moving vehicle. In: CVPR (2007) use a stereo camera system together with a structure-from-movement solution approach in order to detect pedestrians and cars in urban environments. However, they do not explicitly segment the background classes which are necessary for many applications, even when all objects in the scene are known. Hoiem et al., Putting objects in perspective. In: CVPR (2006) evaluate the detected scales of pedestrians and cars together with a rough background segmentation (background labelling) in order to infer the camera standpoint, which in turn improves object detection with the aid of a directed Bayes network. In contrast to the present invention, object detections are refined via the background context, but not vice-versa. Additionally, only individual images are observed, wherein the presence of an object is assumed. Equally, Torralba, Contextual priming for object detection. IJCV (2003) 169-191, evaluates filter bank responses in order to obtain a scene prior for object detection.

3. Conditional Random Field Models

The following section successfully introduces the model according to the present invention. It is divided into three sections. The first section considers single layer CRFs, the second models additional objects in a separate layer and the final section adds the dynamic of the objects and the scene.

The initial image regarding the time t is currently designated $x^t$, the related class segmentations (class labels) on the grid cell level are designated $y^t$ and the object segmentations are designated $o^t$.

3.1 Basic CRF (Plain CRF): Single Layer CRF Model for Scene Class Segmentation (Scene Class Labelling)

In general, a CRF models the conditional probability of all class segmentations yt with a given input image xt. In a similar manner to others, with the invention, the set or quantity of adjacent relationships N1 is modelled through to cliques in pairs, in order to maintain the possibility of calculating the inference. For this reason, according to the invention, the following model applies:

$$\log(P_{pCRF}(y^t \mid x^t, N_1, \Theta)) = \qquad (1)$$
$$\sum_i \Phi(y_i^t, x^t; \Theta_\Phi) + \sum_{(i,j) \in N_1} \Psi(y_i^t, y_j^t, x^t; \Theta_\Psi) - \log(Z^t)$$

$Z^t$ designates the "partition function", which is used for normalisation purposes. $N_1$ is the set or quantity of all spatial adjacencies in pairs. We designate this model as the basis CRF or flat CRF (plain CRF).

Unary Potentials

The unary potentials according to the invention model local features for all classes C, including scenes or scene classes, as well as object classes. For this purpose, Joint Boosting See: Torralba, A. et al, Sharing features: Efficient boosting procedures for multiclass object detection. In: CVPR (2004) is used as a classifier in order to learn a strong classifier:

$$H(c, f(\chi_i^t); \Theta_\Phi) = \Sigma_{m=1}^M h_m(c, f(\chi_i^t); \Theta_\Phi)$$

Here, $f(\chi_i^t)$ designates the features which have been extracted from the input image for the grid point i. M is the number of tours and c are the class segmentations (class labels). $h_m$ are "weak classifiers" with parameters $\Theta_\Phi$, and are distributed to all classes for this solution approach. In order to interpret the reinforcement confidence as a probability, a softmax transformation See: Kumar, et al., A hierarchical field framework for unified context-based classification. In: ICCV (2005) is used. Thus, the potential becomes:

$$\Phi(y_i^t = k, x^t; \Theta_\Phi) = \log \frac{\exp H(k, f(\chi_i^t); \Theta_\Phi)}{\sum_c \exp H(c, f(\chi_i^t); \Theta_\Phi)} \qquad (2)$$

Edge Potentials

The edge potentials model the interaction between class segmentations on two adjacent sites $y_i^t$ and $y_j^t$ in a right-angled grid. The interaction strength is modelled by a linear, discriminative classifier with parameters $\Theta_\Psi = W^T$ and depends on the difference between the node features $$d_{ij}^t := |f(\chi_i^t) - f(\chi_j^t)| \qquad (3)$$

$$\Psi(y_i^t, y_j^t, x^t; \Theta_\Psi) = \sum_{(k,l) \in C} w^T \begin{pmatrix} 1 \\ d_{ij}^t \end{pmatrix} \delta(y_i^t = k) \delta(y_j^t = l)$$

3.2 Object CRF: Dual Layer Object CRF for Shared Object and Scene Segmentation

The information which can be obtained locally from an image patch tends to be limited and edge potentials in pairs are too weak in order to model interactions over greater distances. Ideally, a completely sealed layer of non observed variables could be added in order to code possible sites and scales of objects, but since the inference for such a model would be complex to calculate, it is recommended that individual hidden variables $o^t = \{o_1^t \ldots, o_D^t\}$ be inserted (wherein D is the number of detections), as shown in FIG. 4 (a). In order to instance these nodes, each four-scale object detector can be used.

The additional nodes derive the appearance of an object from a strongly spatial model and are connected with the quantity of all corresponding hidden variables $$\{y^t\}_{o_n^t}$$

the evidence of which $$\{x^t\}_{o_n^t}$$

supports the object hypothesis. The segmentations (labels) of the new nodes within the scope of this invention consist of O={object, background}; however, the extension to a plurality of object classes is easy to realise, for which reason the invention also extends to these. For this reason, two new potentials are introduced into the CRF model, which is given by the equation (1) and contain the object CRF $$\log(P_{oCRF}(y^t, o^t \mid x^t, \Theta)) = \log(P_{pCRF}(y^t \mid x^t, N_2, \Theta)) + \qquad (4)$$
$$\sum_n \Omega(o_n^t, x^t; \Theta_\Omega) + \sum_{(i,j,n) \in N_3} \Lambda(y_i^t, y_j^t, o_n^t, x^t; \Theta_\Psi)$$

It should be noted that $N_2 \subset N_1$ designates all adjacencies for which no object is present in the scene, wherein $N_3$ designates all adjacencies between layers with assumed object sites. $\Omega$ is the new unary object potential, wherein by contrast, $\Lambda$ is the edge potential between layers.

Unary Object Potentials

In order to define object potentials, an object detector according to the prior art is used within the scope of the invention. A sliding window-based solution approach See: Dalal, N. et al.: Histograms of oriented gradients for human detection. In: CVPR (2005) is used, wherein the features of a window are defined by $$g(\{x^t\}_{o_n^t})$$

and are classified with a linear SVM, wherein the weights are v and b is the bias of the hyperplane. In order to attain an interpretation of the theoretical probability for the classification margin, the methods of Platt, Probabilistic outputs for support vector machines and comparison to regularized likelihood methods. In Smola, A. J., Bartlett, P., Schoelkopf, B., Schuurmans, D., eds: Advances in Large Margin Classifiers. (2000) 61-74, are adopted and a sigmoid with the parameters $s_1$ and $s_2$ is adapted using a cross validation.

$$\Omega(o_n^t, x^t; \Theta_\Omega) = \log \frac{1}{1 + \exp(s_1 \cdot (v^T \cdot g(\{x^t\}_{o_n^t}) + b) + s_2)} \qquad (5)$$

Consequently, the parameters are determined for $$\Theta_\Omega = \{v, b, s_1, s_2\}$$

Edge potentials between layers (inter-layer edge potentials):

For the inter-layer potentials, the adjacent relationships are modelled in cliques, which consists of two lower positioned nodes from the first layer $y_i^t$, $y_j^t$ and the object hypothesis nodes $o_n^t$. In a similar manner to the edge potentials in pairs on the lower level, the interaction strength of the nodes is modelled via a linear classifier with weightings $\Theta_\Lambda = u$.

$$\Lambda(y_i^t, y_j^t, o_n^t, x^t; \Theta_\Lambda) = \sum_{(k,l) \in C; m \in O} u_T \begin{pmatrix} 1 \\ d_{ij}^t \end{pmatrix} \delta(y_i^t = k) \delta(y_j^t = l) \delta(o_n^t = m) \qquad (6)$$

It is important to ascertain that the inter-layer interactions are anisotropic and scale-dependent. Within the scope of the invention, the scales given by the object detector are evaluated in order to train different weightings for different scales, and thus an actual, four-scale model can be achieved in the CRF framework. Furthermore, the invention uses different sets of weightings for different parts of the detected object, and thus enforces an object- and context-consistent layout See: Winn et al., "The layout consistent random field for recognizing and segmenting partially occluded objects. In: CVPR (2006).

3.3 Dynamic CRF: Dynamic Dual Layer CRF for Object and Scene Class Segmentation (Object and Scene Class Labelling)

While the additional information from an object detector already increases the classification precision, time-related information is a further important input. The invention recommends two time-related extensions for the framework described thus far. For highly dynamic scenes—such as image sequences which are taken from a driving car, which is designed for use as a sample application for the model according to the invention—it is important to ascertain that objects and the remaining scenes have a different dynamic, and should thus be modelled differently. For objects, their movement is estimated and tracked with a time filter in the three-dimensional space (3D). The dynamic for the remaining scene is caused chiefly by the camera movement in the sample scenario described. For this reason, an estimation of the movement of the camera itself can be used in order to propagate the inferred scene segments (scene labels) at the time T as a prior for time point t+1.

After both object and scene dynamic have each transferred information forwards to future time points, directed links within the scope of the invention are used in the corresponding graphic models, as shown in FIG. 4 (b). It is also possible to introduce non-directed links, but these are more complex to calculate. Furthermore, they may be less desirable from the application perspective due to the information flow which is directed backwards in time while online processing is required.

Object Dynamic Model

In order to model the object dynamic, within the scope of the invention, a plurality of extended Kalman filters See: Kalman, R. E., A new approach to linear filtering and prediction problems. Transactions of the ASME-Journal of Basic Engineering 82 (1960) 35-45, is used—one for each object. For the data record of dynamic scenes described in the experimental section of the exemplary embodiment, the camera calibration is known and the sequences are recorded from a moving vehicle. Additionally, it is assumed that the object is located at ground level. As a result, Kalman filters are capable of modelling the object position in 3D coordinates. Furthermore, the status vector contains the width and speed of the object at ground level, together with the camera appropriation and all first derivatives of the status variables according to time.

For the movement model, linear movement dynamics are used, wherein the acceleration is modelled as system noise, which has been proven to be sufficient for the image sequences used below. The confidences of the tracks are given by the last assigned detection result. Thus the following integrated model is obtained:

$$\log(P_{tCRF}(y^t, o^t | x^t, \Theta)) = \log(P_{pCRF}(y^t | x^t, N_2, \Theta)) + \sum_n \kappa^t(o_n^t, o^{t-1}, x^t; \Theta_K) + \sum_{(i,j,n)\in N_3} \Lambda(y_i^t, y_j^t, o_n^t, x^t; \Theta_\Lambda) \quad (7)$$

wherein $\kappa^t$ models the probability of an object hypothesis $o_n^t$ at a time t with the given history of input images. It replaces the potentials previously introduced for objects $\Omega$. The parameter vectors consist of the detector parameters and additionally the dynamics of the Kalman filter {A, W} and the measurement model {$H_t, V_t$} and thus, the following applies $$\Theta_K = t_\Omega \cup \{A, W, H_t, V_t\}$$

Scene Dynamic Model

In the sense of a recursive Bayes status estimation using a Markov assumption, the posterior distribution of $y^{t-1}$ is used as a prior for time stage t. However, the image content must be transformed for dynamic scenes in order to connect grid points with the correct posterior distribution. Within the scope of the invention, the project Q from $y^t$ to $y^{t+1}$ is estimated for a given camera translation and camera calibration ($\Theta_{A^t}$). Thus an additional unary potential is obtained for $y^t$.

$$\Delta^t(y_i^t, y^{t-1}; \Theta_{A^t}) = \log(P_{tCRF}(y_{Q^{-1}(i)}^{t-1} | \Theta)) \quad (8)$$

The complete dynamic CRF model including both object dynamic, i.e. including scene dynamic as shown in FIG. 4(b) is therefore $$\log(P_{dCRF}(y^t, o^t, x^t | y^{t-1}, o^{t-1}, \Theta)) = \log(P_{tCRF}(y^t, o^t | x^t, \Theta)) + \sum_i \Delta^t(y_i^t, y^{t-1}; \Theta_{A^t}) \quad (9)$$

3.4 Inference and Parameter Estimation

For the inference in the non-directed graphic models, a "Sum Product Loopy Belief Propagation" is sued with a parallel Message Update Schedule. For the parameter estimation, a piece-by-piece learning procedure (See: Sutton, C., McCallum, A.: Piecewise training for undirected models. In: 21th Annual Conference on Uncertainty in Artificial Intelligence (UAI-05) (2005), is selected as a solution approach on the assumption that parameters from unary potentials are conditionally independent from the parameters of the edge potentials. While this no longer guarantees that the optimum parameter setting for Θ can be found, the model can however be learned far more quickly, as is discussed in. (See: Sutton, C., McCallum, A.: Piecewise training for undirected models. In: 21th Annual Conference on Uncertainty in Artificial Intelligence (UAI-05) (2005).

For this reason, prior to learning the edge potential models, the parameters $\Theta_\Phi$, $\Theta_\Omega$ are trained for the unary potentials. The parameter set $\Theta_K$ for the Kalman filters is e.g. set manually to suitable values or set automatically to pre-stored values.

Finally, the parameter sets $\Theta_\Psi$, $\Theta_\Lambda$ of the edge potentials are learned jointly in a maximum likelihood setting with Stochastic Meta Descent (SMD) See: Vishwanathan, S. V. N., et al.: Accelerated training of conditional random fields with stochastic gradient methods. In: ICML (2006). As has been recommended by Vishwanathan et al., a Gauss prior is assumed with a meta parameter σ on the linear weightings in order to avoid overfitting.

The invention is realised according to one exemplary embodiment by an automated method or corresponding object detection device 4 in a vehicle 1, i.e. electronically with the aid of suitable electronics 6, 7, 8 and with sensors with the aid of a suitable sensor system 5. In terms of data processing, a suitable data processing and/or evaluation device 6 and a data storage device 7 is here provided. Here, an object detector for image data, i.e. suitable detector hardware including suitable detector electronics and/or detector software can be used as a sensor system 5. The invention is however not limited to this; a camera, laser sensor, radar sensor or a combination of sensors can also be used as a sensor system 5. The invention is according to the exemplary embodiment realised in the vehicle 1 with the aid of sensors or cameras as a sensor system 5 (input hardware) in order to deliver input data and/or input images and/or input videos. These can then be processed by the data processing and/or evaluation device 6. Furthermore, databases or similar data storage devices can be used as a data storage device 7, in order to supply comparative data and/or comparative images and/or comparative classes for the objects or methods according to the invention—for object and scene class segmentation. The object device 4 according to the invention is specifically designed and adjusted for the purpose of realising the technical features included within the scope of the invention described here, by means of correspondingly adapted electronics and/or software, i.e. the device according to the invention is specifically adapted beyond a pure data processing system for the interaction with a sensor system 5 in order to supply input data and/or input images and/or input videos and for a shared segmentation, on this basis, of object and scene classes according to the dynamic CRF model described here, and to supply corresponding output data which is then shown e.g. to the driver, or which can be used to activate further systems 8 such as driver warning and/or driver assistance systems and/or emergency systems. The invention can for example be used to detect objects 0 such as other vehicles 2, for example on a road 3.

4. Results From Experiments

In the following, results from experiments will be described. In order to evaluate the functioning and effectiveness of the model according to the invention, different experiments were conducted on the basis of two databases. First, the features will be described which were conducted for the texture and location-based classification of scene segments (scene labels) on the scene segment CRF layer (scene label CRF layer). Then, the features will be introduced which were used for the object detection on the object segment CRF layer (object label CRF layer). Subsequently, the results will be discussed in brief which were obtained on the basis of the Sowerby database, and finally, the results will be presented from image sequences on a new dynamic scene data record, which consists of vehicle traffic image sequences which have been taken from a moving vehicle 1 in real-world conditions.

4.1 Features for Scene Segmentation (Scene Labelling)

Texture and Location Features

For the unary potential $\phi$ on the lower layer and for the edge potential $\psi$ and the inter-layer potentials $\Lambda$, texture features and location features are used. The texture features are calculated from the first 16 coefficients of the Walsh-Hadamard transformation. This transformation is a discrete approximation of the Kosiusi transformation and can be calculated effectivelySee: Hel-Or et al., Real-time pattern matching using projection kernels. PAMI27 (2005), 1430-1445 and Alon et al., Off-road path following using region classification and geometric projection constraints. In: CVPR (2006)—even in real time (e.g. on modern graphic hardware). The features are extracted on a plurality of scales from all channels of the input image in the CIE Lab colour space. As a pre-processing stage, a and b channels are normalised using a grey world assumption in order to be able to handle varying colour appearances. The L channel is by contrast normalised in order to correspond to a Gauss distribution with a fixed average in order to handle global lighting variations. Within the scope of the invention, it was also ascertained that a normalisation of the coefficients of the transformation according to Varma and Zisserman, Classifying images of materials: Achieving viewpoint and illumination independence. In: ECCV (2002) is advantageous. They recommend that for every filter response, an $L_1$ normalisation be first conducted, and then to normalise the responses locally for each image pixel. Finally, the average and the variance of the normalised response are used as features for each node in the regular CRF grid. Additionally, the coordinates of the grid points within the image are used as location cues. The pixel coordinates are thus linked or chained to the feature vector.

HOG

In the experiments described below, an HOG (Histogram of Oriented Gradients) detector is used in order to generate the object hypothesis. HOG is a sliding window solution approach, wherein features are calculated on a tight grid. First, histograms of the gradient orientation are calculated in cells, wherein an interpolation is conducted with regard to the gradient site and with regard to the amount. Subsequently, adjacent cells are grouped into overlapping blocks, which are normalised in order to achieve invariance in relation to different lighting conditions. A sample front view and tail view autodetector 4, 5 has a window size of 20×20 pixels. It is trained to a separate data record from the forwards and backwards views from a car, which contains 1492 positive events from the LabelMe database See: Russel et al., A database and web-based tool for image annotation. IJCV 77 (2008) 157-173 and 178 negative image. This can be stored e.g. in the data storage device 7.

4.2 Results

Sowerby Data Record

Figure 6:
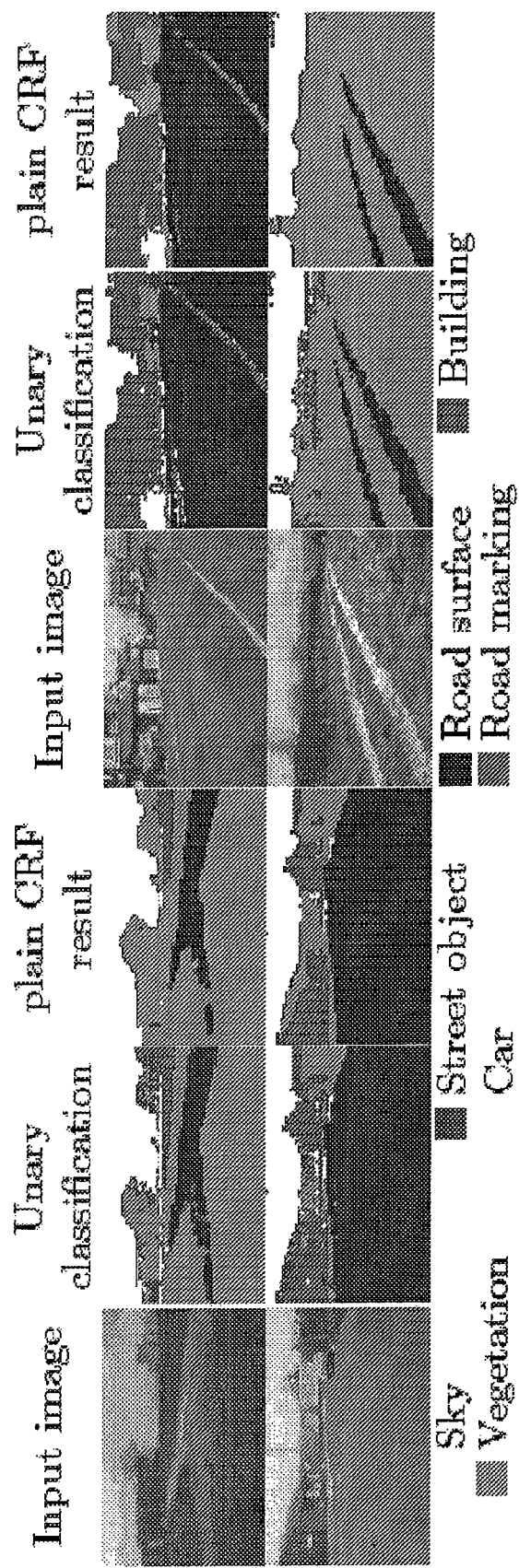
FIG. 6: shows experimental results on the basis of the Sowerby data record with standard CRF classification.

The Sowerby data record is a widely used benchmark for CRFs which contains 7 country landscape classes. The data record comprises 104 images with a resolution of 96-64 pixels. Following the protocol, 60 images were selected randomly for the training, with 44 images for the test. Several sample images with inferred segments (inferred labels) are shown in FIG. 6. However, this data record contains neither image sequences, nor cars which can be detected with an object detector, so that the flat CRF model (equation 1) can only be compared with earlier works on this data record.

The experiments show that the features and CRF parameter estimation according to the invention are competitive in relation to other methods according to the prior art. Table 1 shows an overview of recently published results, and how these compare with the model according to the invention (see FIG. 7).

TABLE 1 comparison with earlier reported results on the basis of the Sowerby data record

| | Pixel-by-pixel precision | |
|---|---|---|
| | Unary classification | Basic CRF model |
| He et al. | 82.4% | 89.5% |
| Kumar and Hebert | 85.4% | 89.3% |

TABLE 1-continued comparison with earlier reported results
on the basis of the Sowerby data record

| | Pixel-by-pixel precision | |
|---|---|---|
| | Unary classification | Basic CRF model |
| Shotton et al. | 85.6% | 88.6% |
| Invention | 84.5% | 91.1% |

While the technically more refined Texton features provide better results for unary classification, the CRF model according to the invention can surpass these since the edge potentials according to the invention are learned from training data. For this data record, a grid with one node for each input pixel is used, while the Gauss prior a was set to 1.25. The Walsh-Hadamard transformation was conducted on the input images with an aperture size of 2, 4, 8 and 16 pixels. Furthermore, a global set of weightings for the isotropic linear classifier of the edge potentials was used, although a differentiation is made between North-South adjacent relationships and East-West adjacent relationships.

Data Record of Dynamic Scenes

In order to evaluate the object and dynamic CRF according to the invention', a new dynamic scene data record is established with image sequences which contain 1936 images in total. The images were recorded by a camera in a driving car and primarily show country roads with a high dynamic of moving vehicles with an image resolution of 752×480 pixels. Vehicles appear in all scales or dimensions from a size of 15 pixels to 200 pixels. The data record contains 176 sequences, each with 11 successive images. It is divided into equal-sized training and test sets of 968 images.

The situation described here can also be present during real operation of the invention, wherein the described image data can be present as input data or as stored data.

Figure 7:
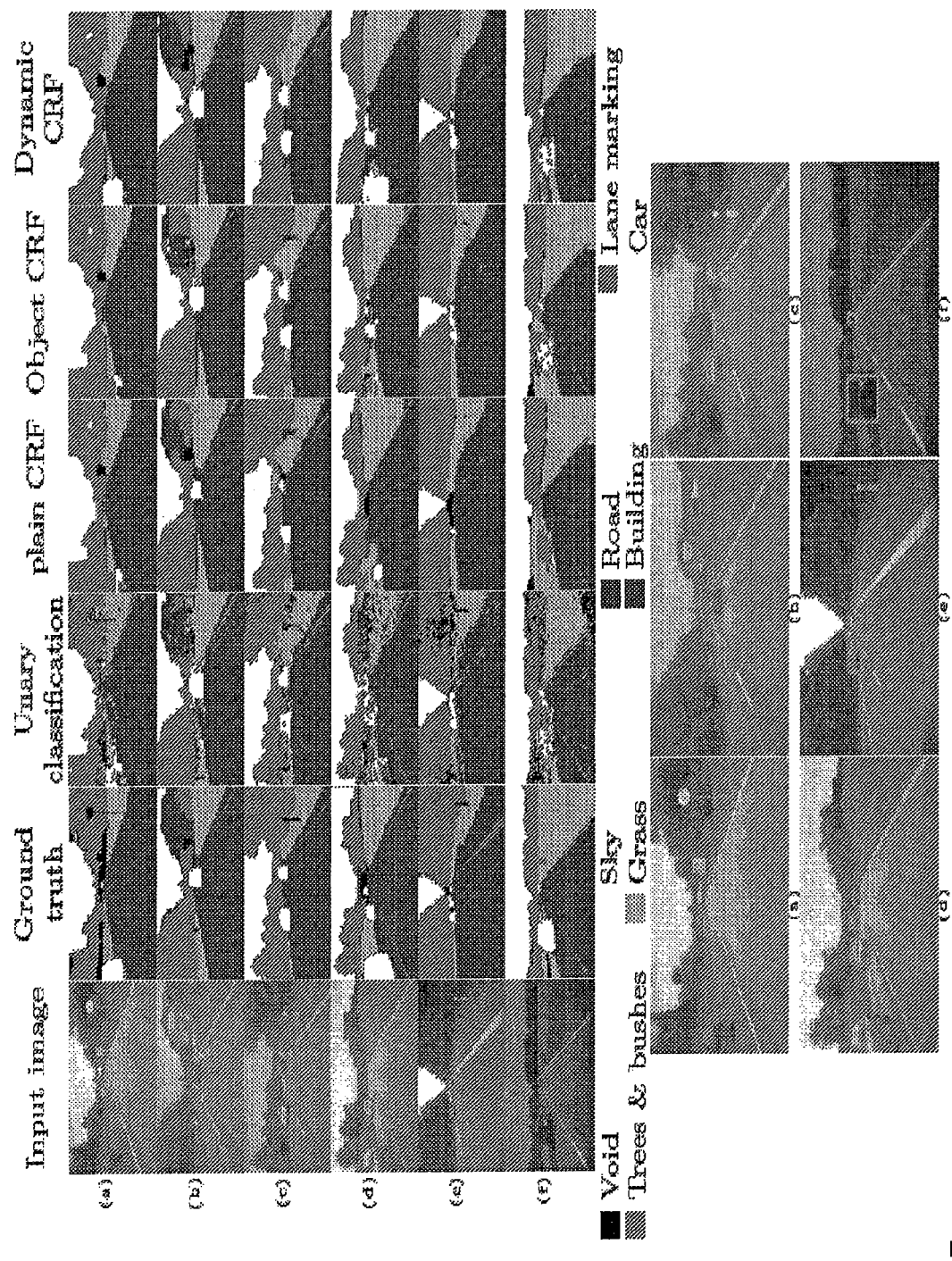
FIG. 7: shows an evaluation result with standard CRF classification, with CRF with additional object nodes and with dynamic CRF.

In order to be able to evaluate the precision of the segmentation at the pixel level, the last image (frame) of each sequence is manually segmented pixel-by-pixel, while the remaining contain only right-angled annotations (bounding box annotations) for the front view and the tail view car object classes. Overall, the data record contains the eight segmentations: void, sky, road, lane marking, building, trees & bushes, grass, and car. FIG. 7 shows several sample scenes. For the following experiments, 8×8 pixels were used for each CRF grid node, and texture features were taken with aperture sizes of 8, 16 and 32 pixels.

We begin with the evaluation of the effectiveness of the unary classifier on the scene class layer. Table 2 lists the pixel-by-pixel classification precision for different variations of the feature. As anticipated, the node position is a valuable cue, according to which there is a high variation in appearance due to different lighting conditions. These vary between bright and sunny lighting with shadows through to cloudy. An additional complication for the pure appearance-based classification are lack of focus due to movement and weak contrast. It can also be seen that normalisation and equally, multi-scale features are helpful for improving classification results.

TABLE 2 evaluation of texture and location features based on pixel-by-pixel overall precision. A multi-scale level includes feature scales of 8, 16 and 32 pixels; a single scale is a feature scale of 8 pixels. It should be noted that these figures do not include the CRF model - when the flat CRF (plain CRF) is added to the best configuration, an overall precision of 88.3% is obtained.

| | | Normalisation | | | |
|---|---|---|---|---|---|
| | | On | | Off | |
| | | Multi-scale | Single scale | Multi-scale | Single scale |
| Position (Location) | On | 82.2% | 81.1% | 79.7% | 79.7% |
| | Off | 69.1% | 64.15 | 62.35 | 62.35 |

Next, the effectiveness of the different recommended CRF models is analysed. On one side, the pixel-by-pixel overall precision is shown. On the other side, the pixel-by-pixel segmentation effectiveness for car object classes is of interest. Overall, car pixels cover 1.3% of the pixels observed overall. However, these are an important fraction for many applications, and are thus also reported in the evaluation presented.

For the experiments, anisotropic linear edge potential classifiers are used with 16 parameter sets, arranged in four lines and four columns. Furthermore, a differentiation is made between North-South and East-West adjacencies. For the inter-layer edge potentials, different sets of weightings were trained, depending on the detection scale or detection dimension (discretised in 6 bins) and depending on the adjacency site in relation to the centre of the object.

Table 3 shows the detection rate and precision of the recommended models. First, the detector used has an even error rate of 78.8% when the car detections are evaluated according to precision and detection rate (recall). If these are evaluated on a pixel-by-pixel basis, the performance corresponds to a detection rate of 60.2%. The missing 39.8% results primarily due to the high standards presented by the data record. It contains cars with weak contrast, cars with a small-sized dimension or scale and only partially visible cars, which leave the field of view. The precision for the detector, evaluated in terms of pixels, is 37.7%. Erroneously classified pixels are mainly located around real objects and on a structured background on which the detector supplies erroneous detections.

TABLE 3 pixel-by-pixel detection rate and precision for the pixels which have been segmented as a car, and overall precision for all classes.

| | No objects | | | With object layer | | | Including object dynamic | | |
|---|---|---|---|---|---|---|---|---|---|
| | Detection rate | Precision | Precision | Detection rate | Precision | Precision | Detection rate | Precision | Precision |
| CRF | 50.1% | 57.7% | 88.3% | 62.9% | 52.3% | 88.6% | 70.4% | 57.8% | 87.7% |
| dyn. CRF | 25.5% | 44.8% | 86.5% | 75.7% | 50.8% | 87.1% | 78.0% | 51.0% | 88.1% |

The effectiveness of the different CRF models will now be considered. Without information from higher layers from an object detector, basic CRFs (plain CRFs) in combination with texture and location features achieve a detection rate of 50.1% with a precision of 57.7%. The detection of cars is problematic with this setup, since CRFs optimise a global energy function, while the car class only constitutes a small fraction of the data. For this reason, the result was dominated chiefly by classes which incorporate the largest regions such as sky, road and trees.

With object information from higher layers (object CRF), the detection rate (recall) can be increased to 62.9% with a slightly lower level of precision, which results from the erroneous detections made by the detector. However, if objects are additionally tracked with a Kalman filter, a recall value of 70.4% is achieved, with a precision of 57.8%. This proves that the object segmentation for the car object classes benefits from the object detector, and also from the dynamic modelling with the aid of a Kalman filter. This is an advantageous embodiment of the invention according to an exemplary embodiment.

must be explained: non-car pixels which are erroneously segmented as cars are chiefly settled on the object boundary, which are primarily caused by scene segmentation forwards propagation artefacts. These are introduced as a result of imprecisions of the speed measurement device, and due to imprecisions in the projection estimation.

A confusion matrix for all classes of database of the dynamic scenes is shown in table 4. FIG. 7 shows sample detections and scene segmentations for the different CRF models in order to illustrate the influence of the different models and their improvements. Thus for example in example (d) the car which leaves the field of view is primarily smoothed out by a basic CRF (plain CRF) and object CRF, while the dynamic CRF is capable of correctly classifying almost the entire area. Additionally, the smaller cars which are smoothed out by a basic CRF are correctly classified by the object CRF and the dynamic CRF. It can also be ascertained that erroneous object detections such as in example (c) do not lead to false segmentation of the scene.

TABLE 4 confusion matrix in percentages for the data record of dynamic scenes; entries are line-normalised

| Actual class | Share | Inferred Sky | Road | Lane marking | Trees & bushes | Grass | Building | Void | Car |
|---|---|---|---|---|---|---|---|---|---|
| Sky | 10.4% | 91.0 | 0.0 | 0.0 | 7.7 | 0.5 | 0.4 | 0.3 | 0.1 |
| Road | 42.1% | 0.0 | 95.7 | 1.0 | 0.3 | 1.1 | 0.1 | 0.5 | 1.3 |
| Lane marking | 1.9% | 0.0 | 36.3 | 56.4 | 0.8 | 2.9 | 0.2 | 1.8 | 1.6 |
| Trees & bushes | 29.2% | 1.5 | 0.2 | 0.0 | 91.5 | 5.0 | 0.2 | 1.1 | 0.4 |
| Grass | 12.1% | 0.4 | 5.7 | 0.5 | 13.4 | 75.3 | 0.3 | 3.5 | 0.9 |
| Building | 0.3% | 1.6 | 0.2 | 0.1 | 37.8 | 4.4 | 48.4 | 6.3 | 1.2 |
| Void | 2.7% | 6.4 | 15.9 | 4.1 | 27.7 | 29.1 | 1.4 | 10.6 | 4.8 |
| Car | 1.3% | 0.3 | 3.9 | 0.2 | 8.2 | 4.9 | 2.1 | 2.4 | 78.0 |

Furthermore, an improvement in overall segmentation precision is observed. While basic CRFs (plain CRFs) attain a precision of 88.3%, the object CRF attains 88.6%, while an additional incorporation of object dynamics further increases the overall segmentation precision to 88.7%. The relative value of 0.4% may appear to be low, but when it is taken into account that the database contains only 1.3% of car pixels overall, this is of some value. Therefore, the conclusion is made that not only the segmentation is improved for the car class, but also the overall scene segmentation quality.

If the scene dynamics are also modelled and posterior distribution is propagated over time (dynamic CRF), an improvement in the recall value attained with the additional object nodes from 25.5% to 75.7% is again observed. The model of the object dynamics can also improve the detection rate to 78.0% correctly segmented pixels. For this reason, the conclusion can again be drawn that the CRF model evaluates both—the information supplied by the object detector and the additional object dynamic—in order to improve segmentation quality.

When finally the overall precision is analysed while the scene dynamic is being modelled, a slight decrease is observed in comparison with a static model. However, in turn it is observed in a corresponding manner that the object information and its dynamic make it possible to achieve an improvement from 86.5% without object information to 87.1% with object CRFs and 88.1% with the full model.

The slightly lesser degree of precision and overall precision for the dynamic scene model in a corresponding manner 5 Conclusions With the present invention, a unifying model application for shared scene and object class segmentation is provided. While CRFs significantly improve the unary pixel-by-pixel classification of scenes, they tend to smooth out smaller regions and object such as cars in a landscape. This applies when objects only comprise a small portion of the overall quantity of pixels. It has been shown that by adding information from higher layers from an HOG object detector according to the prior art, this deficit is improved. Further improvement—when objects are only partially visible—is attained when object dynamics are correctly modelled and when scene segmentation information is propagated over time. The improvement attained is bidirectional; on the one hand, the segmentation of the object classes is improved, and on the other, the other scene classes also profit from the additional source of information.

For future work, a study is to be conducted as to how relationships between different objects such as partial overlapping can be modelled when a plurality of objects classes is detected. Furthermore, we aim to improve the self movement estimation of the camera in order to further improve effectiveness. Finally, it is assumed that the integration of different sensors such as radar will enable a further improvement of results.

The invention claimed is:

1. A method for analysing objects in an environment and/or scenes in an environment with an evaluation unit, the method comprising:

evaluating image data ($x^r$) by the evaluation unit based on a conditional random field model having a first model layer which segments the image data into one or more scenes; and providing additional object nodes ($o^t_n$) to the conditional random field model by forming a second model layer occupied by the additional object nodes which take into account information from an object detector that classifies the image data into one or more objects, the additional object nodes of the second model layer being connected to nodes of the first model layer which support object hypotheses of the corresponding additional object nodes, wherein a shared segmentation of the image data of object and scene classes is conducted.

2. A method for analysing objects in an environment and/or scenes in an environment with an evaluation unit, the method comprising:

evaluating image data ($x^r$) by the evaluation unit based on a conditional random field model having a first model layer which segments the image data into one or more scenes; and providing additional object nodes ($o^t_n$) to the conditional random field model by forming a second model layer occupied by the additional object nodes which take into account information from an object detector that classifies the image data into one or more objects, the additional object nodes of the second model layer being connected to nodes of the first model layer which support object hypotheses of the corresponding additional object nodes, wherein a shared segmentation of the image data of object and scene classes is conducted and dynamic information is integrated within the scope of object detection and scene classification.

3. The method according to claim 1, wherein within a scope of the analysis of objects in the environment and/or scenes in the environment, adjacent relationships ($N_2$, $N_3$) of nodes of the conditional random field model are modelled.

4. The method according to claim 2 wherein within a scope of the analysis of objects in the environment and/or scenes in the environment, adjacent relationships ($N_2$, $N_3$) of nodes of the conditional random field model are modelled.

5. The method according to claim 3, wherein the adjacent relationships ($N_2$, $N_3$) are modelled using edge potentials.

6. The method according to claim 4, wherein the adjacent relationships ($N_2$, $N_3$) are modelled using edge potentials.

7. The method according to claim 1, wherein within a scope of the analysis of objects in the environment and/or scenes in the environment, a support vector machine is also used for object detection and/or object classification.

8. The method according to claim 2, wherein within a scope of the analysis of objects in the environment and/or scenes in the environment, a support vector machine is also used for object detection and/or object classification.

9. The method according to claim 1, wherein on the basis of the conditional random field model within a scope of object detection and/or scene classification, moved cameras and/or moved objects (O) are modelled.

10. The method according to claim 2, wherein on the basis of the conditional random field model within a scope of object detection and/or scene classification, moved cameras and/or moved objects (O) are modelled.

11. The method according to claim 1, wherein the one or more objects (O) and the one or more scenes are modelled in a shared segmentation stage, wherein the modelling is conducted at the first and second model layers with different information granularity and different segmentations in a dynamic conditional random field model.

12. The method according to claim 2, wherein the one or more objects (O) and the one or more scenes are modelled in a shared segmentation stage, wherein the modelling is conducted at the first and second model layers with different information granularity and different segmentations in a dynamic conditional random field model.

13. The method according to claim 11, wherein the second model layer has reduced information granularity, the second model layer being used in order to represent the object nodes ($o^t_n$) and to conduct the method on the basis of dynamic image sequences which contain objects (O) of any size.

14. The method according to claim 12, wherein the second model layer has reduced information granularity, the second model layer being used in order to represent the object nodes ($o^t_n$) and to conduct the method on the basis of dynamic image sequences which contain objects (O) of any size.

15. The method according to claim 1, wherein a pixel-by-pixel object and/or scene class segmentation is conducted.

16. The method according to claim 2, wherein a pixel-by-pixel object and/or scene class segmentation is conducted.

17. The method according to claim 1, wherein objects (O) of any size are integrated into a conditional random field model framework and an inference is conducted jointly for objects (O) and context and/or scene classes.

18. The method according to claim 2, wherein objects (O) of any size are integrated into a conditional random field model framework and an inference is conducted jointly for objects (O) and context and/or scene classes.

19. A method according to claim 1, wherein edge potentials are modelled by taking into account or evaluating a scale supplied by the object detector.

20. A method according to claim 2, wherein edge potentials are modelled by taking into account or evaluating a scale supplied by the object detector.

21. An object detection device for analysing objects in an environment and/or scenes in an environment with a data processing and/or evaluation device, wherein in the data processing and/or the evaluation device, image data ($x^r$) is evaluated on the basis of a conditional random field model having a first model layer which segments the image data into one or more scenes, and the data processing and/or the evaluation device provides additional object nodes ($o^t_n$) to the conditional random field model by forming a second model layer occupied by the additional object nodes which take into account information from an object detector that classifies the image data into one or more objects, the additional object nodes of the second model layer being connected to nodes of the first model layer which support object hypotheses of the corresponding additional object nodes, wherein a shared segmentation of the image data of object and scene classes is conducted.

22. A vehicle with an object detection device for analysing objects in an environment and/or scenes in an environment, with a data processing and/or evaluation device, wherein in the data processing and/or the evaluation device, image data ($x^r$) is evaluated on the basis of a conditional random field model having a first model layer which segments the image data into one or more scenes and the data processing and/or the evaluation device provides additional object nodes ($o^t_n$) to the conditional random field model by forming a second model layer occupied by the additional object nodes which take into account information from an object detector ($\Omega$)

that classifies the image data into one or more objects, the additional object nodes of the second model layer being connected to nodes of the first model layer which support object hypotheses of the corresponding additional object nodes, wherein a shared segmentation of the image data of object and scene classes is conducted, and the vehicle includes a data storage device for storing image data, which is connected in terms of data to the object detection device and/or to the data processing and/or the evaluation device.

23. The device according to claim 21, wherein the object detection device is integrated into a camera device or into a sensor device.

24. The vehicle according to claim 22, wherein the object detection device is integrated into a camera device or into a sensor device.

* * * * *